US010321355B2

(12) United States Patent
Yin et al.

(10) Patent No.: US 10,321,355 B2
(45) Date of Patent: Jun. 11, 2019

(54) ACCESS NODE, MOBILITY MANAGEMENT NETWORK ELEMENT, AND PAGING MESSAGE PROCESSING METHOD

(71) Applicant: Huawei Technologies Co., Ltd., Shenzhen (CN)

(72) Inventors: Yu Yin, Shanghai (CN); Caixia Qi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 15/192,358

(22) Filed: Jun. 24, 2016

(65) Prior Publication Data

US 2016/0309362 A1    Oct. 20, 2016

Related U.S. Application Data

(63) Continuation of application No. PCT/CN2013/090351, filed on Dec. 24, 2013.

(51) Int. Cl.
*H04L 12/741* (2013.01)
*H04L 12/801* (2013.01)
(Continued)

(52) U.S. Cl.
CPC ......... *H04W 28/0289* (2013.01); *H04L 43/16* (2013.01); *H04L 45/745* (2013.01);
(Continued)

(58) Field of Classification Search
CPC ....... H04L 12/26; H04L 12/741; H04L 29/06; H04L 47/12; H04L 47/19; H04L 47/2416;
(Continued)

(56) References Cited

U.S. PATENT DOCUMENTS

| 6,763,004 B1 | 7/2004 | De |
| 2002/0085532 A1* | 7/2002 | Kim ........................ H04L 29/06 370/338 |

(Continued)

FOREIGN PATENT DOCUMENTS

| CN | 1567905 A | 1/2005 |
| CN | 101026861 A | 8/2007 |

(Continued)

OTHER PUBLICATIONS

Foreign Communication From a Counterpart Application, Russian Application No. 2016130285, Russian Notice of Allowance dated Nov. 16, 2017, 18 pages.

(Continued)

*Primary Examiner* — Raj Jain
(74) *Attorney, Agent, or Firm* — Conley Rose, P.C.

(57) ABSTRACT

A mobility management network element receives a node capability notification message from the access node, where the node capability notification message is used to indicate that the access node supports use of a user datagram protocol (UDP), to receive a paging message from the mobility management network element, the mobility management network element selects the UDP to send a first paging message to the access node such that a consumption degree of resources of the mobility management network element may be reduced, and occurrence of congestion on the mobility management network element may be avoided.

24 Claims, 10 Drawing Sheets

(51) Int. Cl.
*H04L 12/26* (2006.01)
*H04W 28/02* (2009.01)
*H04W 68/00* (2009.01)
*H04W 92/14* (2009.01)
*H04L 29/06* (2006.01)
*H04W 8/08* (2009.01)
*H04W 8/24* (2009.01)
*H04W 68/02* (2009.01)
*H04W 88/08* (2009.01)
*H04W 88/14* (2009.01)
*H04W 88/16* (2009.01)

(52) U.S. Cl.
CPC .............. *H04L 47/12* (2013.01); *H04L 47/19* (2013.01); *H04L 69/22* (2013.01); *H04W 8/08* (2013.01); *H04W 8/24* (2013.01); *H04W 28/0268* (2013.01); *H04W 68/00* (2013.01); *H04W 68/02* (2013.01); *H04W 92/14* (2013.01); *H04W 88/08* (2013.01); *H04W 88/14* (2013.01); *H04W 88/16* (2013.01)

(58) Field of Classification Search
CPC . H04Q 7/20; H04Q 7/24; H04W 8/08; H04W 8/24; H04W 28/02; H04W 68/02; H04W 68/04
See application file for complete search history.

(56) References Cited

U.S. PATENT DOCUMENTS

| | | | | |
|---|---|---|---|---|
| 2007/0191031 | A1* | 8/2007 | Mohanty | H04W 68/04 455/458 |
| 2008/0165709 | A1 | 7/2008 | Soliman | |
| 2009/0268722 | A1* | 10/2009 | Gallagher | H04W 8/08 370/352 |
| 2010/0150049 | A1* | 6/2010 | Kim | H04W 76/12 370/312 |
| 2010/0263021 | A1 | 10/2010 | Arnott et al. | |
| 2013/0089076 | A1* | 4/2013 | Olvera-Hernandez | H04W 36/22 370/332 |
| 2013/0336118 | A1* | 12/2013 | Shaw | H04L 41/0813 370/235 |
| 2015/0163149 | A1* | 6/2015 | Norlander | H04L 47/12 370/392 |
| 2016/0309362 | A1* | 10/2016 | Yin | H04W 68/00 |

FOREIGN PATENT DOCUMENTS

| | | |
|---|---|---|
| CN | 101048991 A | 10/2007 |
| CN | 101094510 A | 12/2007 |
| CN | 101808401 A | 8/2010 |
| CN | 102348278 A | 2/2012 |
| CN | 102523157 A | 6/2012 |
| JP | 2012195969 A | 10/2012 |
| RU | 2437258 C2 | 12/2011 |

OTHER PUBLICATIONS

Foreign Communication From a Counterpart Application, Russian Application No. 2016130285, English Translation of Russian Notice of Allowance dated Nov. 23, 2017, 15 pages.
Nokia, "Text Proposal for TR R3.018 on Signalling Transport for paging on S1-C," 3GPP TSG RAN WG3#53bis, R3-0601579, Oct. 10-13, 2006, 4 pages.
Foreign Communication From a Counterpart Application, Japanese Application No. 2016-542237, Japanese Notice of Rejection dated Aug. 8, 2017, 2 pages.
Foreign Communication From a Counterpart Application, Japanese Application No. 2016-542237, English Translation of Japanese Notice of Rejection dated Aug. 8, 2017, 3 pages.
Partial English Translation and Abstract of Chinese Patent Application No. CN1567905, Jan. 19, 2005, 15 pages.
Partial English Translation and Abstract of Chinese Patent Application No. CN101026861, Aug. 29, 2007, 31 pages.
Partial English Translation and Abstract of Chinese Patent Application No. CN101048991, Oct. 3, 2007, 48 pages.
Partial English Translation and Abstract of Chinese Patent Application No. CN101808401, Aug. 18, 2010, 27 pages.
Partial English Translation and Abstract of Chinese Patent Application No. CN102523157, Jun. 27, 2012, 16 pages.
Partial English Translation and Abstract of Chinese Patent Application No. CN101094510, Jul. 11, 2016, 4 pages.
"C-plane signalling transport for paging," 3GPP TSG RAN WG3#53bis, R3-0601468, Oct. 10-13, 2006, 4 pages.
"S1 Functions," 3GPP TSG RAN WG3 Meeting #53bis, R3-061537, Oct. 10-13, 2006, 6 pages.
Foreign Communication From a Counterpart Application, European Application No. 13900009.5, Extended European Search Report dated Nov. 15, 2016, 7 pages.
Foreign Communication From a Counterpart Application, Chinese Application No. 201380002944.6, Chinese Office Action dated Nov. 28, 2016, 6 pages.
Foreign Communication From a Counterpart Application, PCT Application No. PCT/CN2013/090351, English Translation of International Search Report dated Oct. 13, 2014, 2 pages.
Foreign Communication From a Counterpart Application, PCT Application No. PCT/CN2013/090351, English Translation of Written Opinion dated Oct. 13, 2014, 17 pages.

* cited by examiner

US 10,321,355 B2

ACCESS NODE, MOBILITY MANAGEMENT NETWORK ELEMENT, AND PAGING MESSAGE PROCESSING METHOD

CROSS-REFERENCE TO RELATED APPLICATION

This application is a continuation of International Application No. PCT/CN2013/090351, filed on Dec. 24, 2013, which is hereby incorporated by reference in its entirety.

TECHNICAL FIELD

The present disclosure relates to the field of network communications technologies, and in particular, to an access node, a mobility management network element, and a paging message processing method.

BACKGROUND

In a mobile communications network, one communications protocol, such as the stream control transmission protocol (SCTP) or the user datagram protocol (UDP), is generally used between a mobility management network element and an access node to process a paging message. However, it is extremely difficult to use only one communications protocol to meet a requirement of a user for reliable transmission of a paging message and, at the same time, avoid a problem of congestion on the mobility management network element that is caused by excessively heavy resource consumption.

For example, because the SCTP is a connection-oriented data packet transmission protocol, it is extremely reliable to process the paging message using the SCTP. However, for the purpose of implementing high reliability of the SCTP, a mobility management network element consumes a large quantity of resources when using the SCTP to process the paging message, and a problem of congestion on the mobility management network element may easily occur.

For another example, because the UDP features stateless switching and is connectionless, when the SCTP is used to process the paging message, when interacting with the access node, the mobility management network element may directly send a data packet using a port and according to a destination address. Therefore, when using the UDP to process the paging message, the mobility management network element consumes less resources, but at the same time, the reliability is relatively poor.

SUMMARY

A main technical problem to be resolved by the present disclosure is to provide an access node, a mobility management network element, and a paging message processing method in order to meet a requirement of a user for reliable transmission of a paging message, reduce consumption of resources of the mobility management network element in a paging message processing process, and avoid a problem of congestion on the mobility management network element.

According to a first aspect of the present disclosure, a paging message processing method is provided, where the method includes receiving, by a mobility management network element, a node capability notification message sent by an access node, where the node capability notification message is used to indicate that the access node supports use of the UDP, which is different from the SCTP, to receive a paging message from the mobility management network element, and the access node supports use of the SCTP to receive the paging message from the mobility management network element, and selecting and using, by the mobility management network element, the UDP to send a first paging message to the access node.

In a first possible implementation manner of the first aspect, selecting and using, by the mobility management network element, the UDP to send a first paging message to the access node includes determining whether congestion occurs when the SCTP is being used by the mobility management network element to send the paging message, and selecting and using the UDP to send the first paging message to the access node when the congestion occurs.

With reference to the first possible implementation manner of the first aspect, in a second possible implementation manner of the first aspect, determining whether congestion occurs when the SCTP is being used by the mobility management network element to send the paging message includes acquiring usage of a central processing unit of the mobility management network element when the SCTP is being used by the mobility management network element to send the paging message, and determining whether the usage exceeds a threshold, and determining that the congestion occurs when the SCTP is being used by the mobility management network element to send the paging message, and if the usage exceeds the threshold.

With reference to the first possible implementation manner of the first aspect, in a third possible implementation manner of the first aspect, determining whether congestion occurs when the SCTP is being used by the mobility management network element to send the paging message includes determining whether a phenomenon of a data packet loss occurs when the SCTP is being used by the mobility management network element to send the paging message, and determining that the congestion occurs when the SCTP is being used by the mobility management network element to send the paging message, and if the phenomenon of the data packet loss occurs.

In a fourth possible implementation manner of the first aspect, selecting and using, by the mobility management network element, the UDP to send a first paging message to the access node includes receiving, by the mobility management network element, a data packet that is sent by a serving gateway to trigger the paging message, and acquiring an attribute of the data packet, and sending the first paging message to the access node by selecting and using the UDP according to the attribute of the data packet.

With reference to the fourth possible implementation manner of the first aspect, in a fifth possible implementation manner of the first aspect, the attribute of the data packet is determined according to one of the following parameters an enhanced packet switch (EPS) bearer identity, a linked bearer identity (LBI), an access point name (APN), a quality of service (QoS) classifier identity, and an allocation/retention priority (ARP).

With reference to the fifth possible implementation manner of the first aspect, in a sixth possible implementation manner of the first aspect, acquiring an attribute of the data packet includes acquiring the EPS bearer identity (EBI) corresponding to the data packet, locating a bearer context according to the EBI to obtain a corresponding APN or QoS classifier identity (QCI), and determining the attribute of the data packet according to the APN or the QCI.

With reference to the fifth possible implementation manner of the first aspect, in a seventh possible implementation manner of the first aspect, acquiring an attribute of the data packet includes acquiring the LBI corresponding to the data packet, locating a bearer context according to the LBI to obtain a corresponding APN, and determining the attribute of the data packet according to the APN.

In an eighth to a fifteenth possible implementation manners of the first aspect, the node capability notification message is an evolved node B (eNodeB) configuration update message or an S1 establishment request message that carries an identifier that indicates whether the access node supports the UDP.

According to a second aspect of the present disclosure, a paging message processing method is provided, where the method includes sending, by an access node, a node capability notification message to a mobility management network element, where the node capability notification message is used to indicate that the access node supports use of the UDP, which is different from the SCTP, to receive a paging message from the mobility management network element, and the access node supports use of the SCTP to receive the paging message from the mobility management network element, and receiving, by the access node, a first paging message that is sent by the mobility management network element by selecting and using the UDP.

In a first possible implementation manner of the second aspect, the method further includes, after the access node receives the first paging message that is sent by the mobility management network element by selecting and using the UDP, acquiring, by the access node, SCTP connection information of the mobility management network element according to a mobility management network element identifier in the first paging message, and determining whether a first Internet Protocol (IP) address in the SCTP connection information is the same as a second IP address in the first paging message, and sending, by the access node, the first paging message to a user terminal if the first IP address is the same as the second IP address, or discarding, by the access node, the first paging message if the first IP address is different from the second IP address.

In the second to the third possible implementation manners of the second aspect, the node capability notification message is an eNodeB configuration update message or an S1 establishment request message that carries an identifier that indicates whether the access node supports the UDP.

According to a third aspect of the present disclosure, a mobility management network element, where the mobility management network element includes a message receiving module configured to receive a node capability notification message sent by an access node, where the node capability notification message is used to indicate that the access node supports use of the UDP, which is different from the SCTP, to receive a paging message from the mobility management network element, and the access node supports use of the SCTP to receive the paging message from the mobility management network element, and a message sending module configured to select and use the UDP to send a first paging message to the access node.

In a first possible implementation manner of the third aspect, the message sending module includes a determining unit configured to determine whether congestion occurs when the SCTP is being used by the mobility management network element to send the paging message, and a message sending unit configured to select and use the UDP to send the first paging message to the access node when the determining unit determines that the congestion occurs when the SCTP is being used by the mobility management network element to send the paging message.

With reference to the first possible implementation manner of the third aspect, in a second possible implementation manner of the third aspect, the message sending module further includes a usage acquiring unit configured to acquire usage of a central processing unit of the mobility management network element when the SCTP is being used by the mobility management network element to send the paging message, where when the usage that is of the central processing unit and acquired by the usage acquiring unit exceeds a threshold, the determining unit determines that the congestion occurs when the SCTP is being used by the mobility management network element to send the paging message.

With reference to the second possible implementation manner of the third aspect, in a third possible implementation manner of the third aspect, the message sending module further includes a packet loss determining unit configured to determine whether a phenomenon of a data packet loss occurs when the SCTP is being used by the mobility management network element to send the paging message, where when the packet loss determining unit determines that the phenomenon of the data packet loss occurs when the SCTP is being used by the mobility management network element to send the paging message, the determining unit determines that the congestion occurs when the SCTP is being used by the mobility management network element to send the paging message.

With reference to the first possible implementation manner of the third aspect, in a fourth possible implementation manner of the third aspect, the message sending module further includes a data packet receiving unit configured to receive a data packet that is sent by a serving gateway to trigger the paging message, an attribute acquiring unit configured to acquire an attribute of the data packet according to the data packet received by the data packet receiving unit, and a message sending unit configured to select and use the UDP to send the first paging message to the access node according to the attribute that is of the data packet and that is acquired by the attribute acquiring unit.

With reference to the fourth possible implementation manner of the third aspect, in a fifth possible implementation manner of the third aspect, the attribute of the data packet is determined according to one of the following parameters: an EBI, an LBI, an APN, a QCI, and an ARP.

With reference to the fifth possible implementation manner of the third aspect, in a sixth possible implementation manner of the third aspect, the attribute acquiring unit is configured to acquire the EBI, locate a bearer context according to the EBI to obtain a corresponding APN or QCI, and determine the attribute of the data packet according to the APN or the QCI.

With reference to the fifth possible implementation manner of the third aspect, in a seventh possible implementation manner of the third aspect, the attribute acquiring unit is configured to acquire the LBI, locate a bearer context according to the LBI to obtain a corresponding APN, and determine the attribute of the data packet according to the APN.

According to a fourth aspect of the present disclosure, an access node is provided, where the access node includes a message sending module configured to send a node capability notification message to a mobility management network element, where the node capability notification message is used to indicate that the access node supports use of the UDP, which is different from the SCTP, to receive a paging message from the mobility management network element, and the access node supports use of the SCTP to receive the paging message from the mobility management network element, and a message receiving module configured to receive the first paging message that is sent by the mobility management network element by selecting and using the UDP.

In a first possible implementation manner of the fourth aspect, the access node further includes an acquiring module configured to acquire SCTP connection information of the mobility management network element according to a mobility management network element identifier in the first paging message after the message receiving module receives the first paging message that is sent by the mobility management network element by selecting and using the UDP, and a determining module configured to determine whether a first IP address in the SCTP connection information acquired by the acquiring module is the same as a second IP address in the first paging message, where the message sending module sends the first paging message to a user terminal if the determining module determines that the first IP address is the same as the second IP address, or the message sending module discards the first paging message if the determining module determines that the first IP address is different from the second IP address.

According to a fifth aspect of the present disclosure, a mobility management network element is provided, where the mobility management network element includes a processor, a memory, and a network interface, where the processor receives a node capability notification message sent by an access node, the node capability notification message is used to indicate that the access node supports use of the UDP, which is different from the SCTP, to receive a paging message from the mobility management network element, and the access node supports use of the SCTP to receive the paging message from the mobility management network element, and the processor select and use the UDP to send a first paging message to the access node.

According to a sixth aspect of the present disclosure, an access node is provided, where the access node includes a processor, a memory, and a network interface, where the processor sends a node capability notification message stored in the memory to a mobility management network element using the network interface, the node capability notification message is used to indicate that the access node supports use of the UDP, which is different from the SCTP, to receive a paging message from the mobility management network element, and the access node supports use of the SCTP to receive the paging message from the mobility management network element, and the processor receives, using the network interface, a first paging message that is sent by the mobility management network element by selecting and using the UDP.

A beneficial effect of the present disclosure compared with the prior art, according to the access node, the mobility management network element, and the paging message processing method that are provided in the present disclosure, after a message receiving module receives a node capability notification message sent by the access node, a message sending module select and use the UDP to send a first paging message to the access node such that a requirement of a user for reliable transmission of a paging message can be met, a consumption degree of resources of the mobility management network element can be reduced, and occurrence of congestion on the mobility management network element can be avoided.

DESCRIPTION OF EMBODIMENTS

In the following, the present disclosure is described in detail with reference to accompanying drawings and embodiments.

Figure 1:
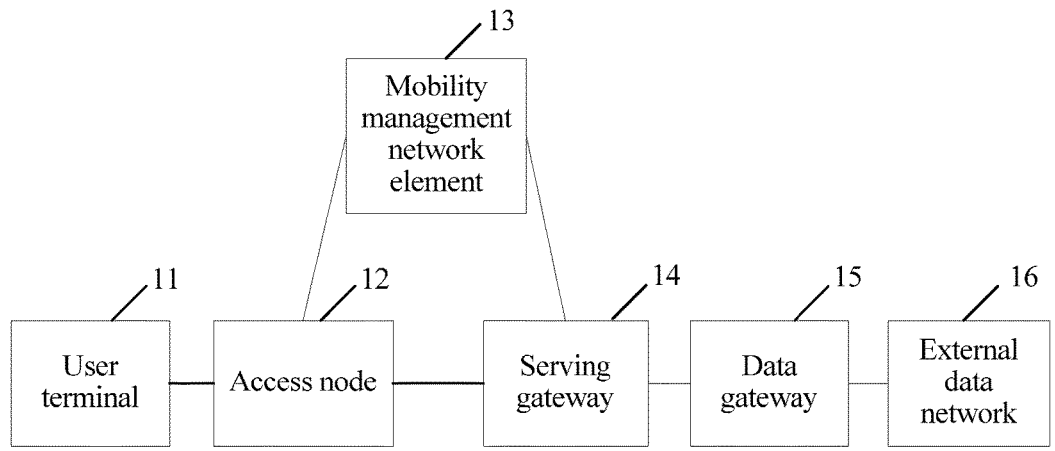
FIG. 1 is a network architecture diagram of a mobile communications network.

Referring to FIG. 1, FIG. 1 is a network architecture diagram of a mobile communications network. As shown in FIG. 1, the mobile communications network is an EPS network. A user terminal 11 may be connected to the mobile communications network using a local access node 12, where a network where the access node 12 is located may be an evolved universal terrestrial radio access network (E-UTRAN), which is formed by an eNodeB. A mobility management network element 13 mainly implements functions such as mobility management, bearer management, and user authentication. The mobility management network element 13 may be a MME. A serving gateway 14 is a local access gateway for the user terminal 11 and mainly implements functions such as identifying packet data at a transmission layer, and routing and forwarding the packet data. The serving gateway 14 may be a serving gateway (SGW). A data gateway 15 is a gateway used by the user terminal 11 to access an external data network 16. The data gateway 15 may be a packet data network gateway (PGW). The external data network 16 is an IP service network of an operator, for example, an IP multimedia subsystem (IMS) or a professional surveillance system (PSS).

Figure 2:
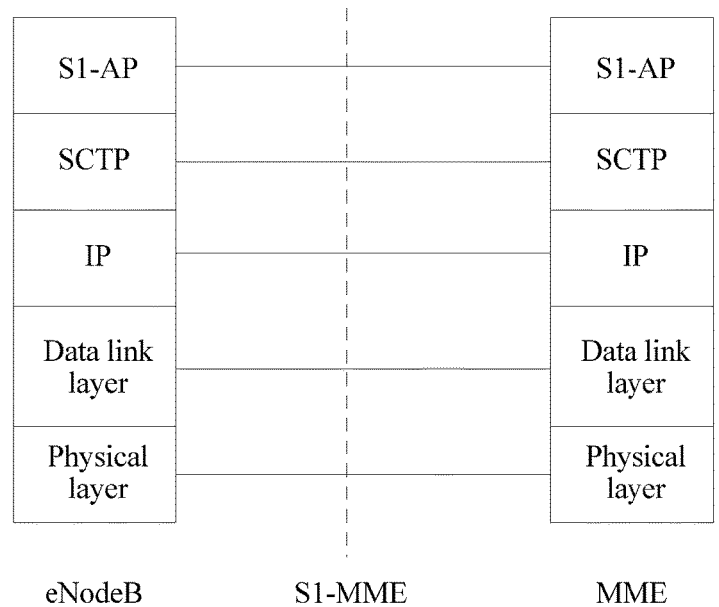
FIG. 2 is a schematic diagram of an architecture of an interface protocol stack between an eNodeB and a mobility management entity (MME) that are based on the SCTP.

A communication transmission protocol is applicable to message transmission between the access node 12 and the mobility management network element 13. For example, the access node 12 is an eNodeB, and the mobility management network element 13 is an MME. Referring to FIG. 2, FIG. 2 is a schematic diagram of an architecture of an interface protocol stack between an eNodeB and an MME that are based on the SCTP. As shown in FIG. 2, interaction between the eNodeB and the MME is performed using an S1 interface, where the S1 interface between the eNodeB and the MME may be denoted as an S1-MME interface. Transmission at an S1 interface transmission network layer is performed on the basis of the IP. The SCTP is used on the basis of the IP to provide reliable transmission for a message at an application layer. A protocol of an S1 interface application layer is an S1 application protocol (S1AP).

Figure 3:
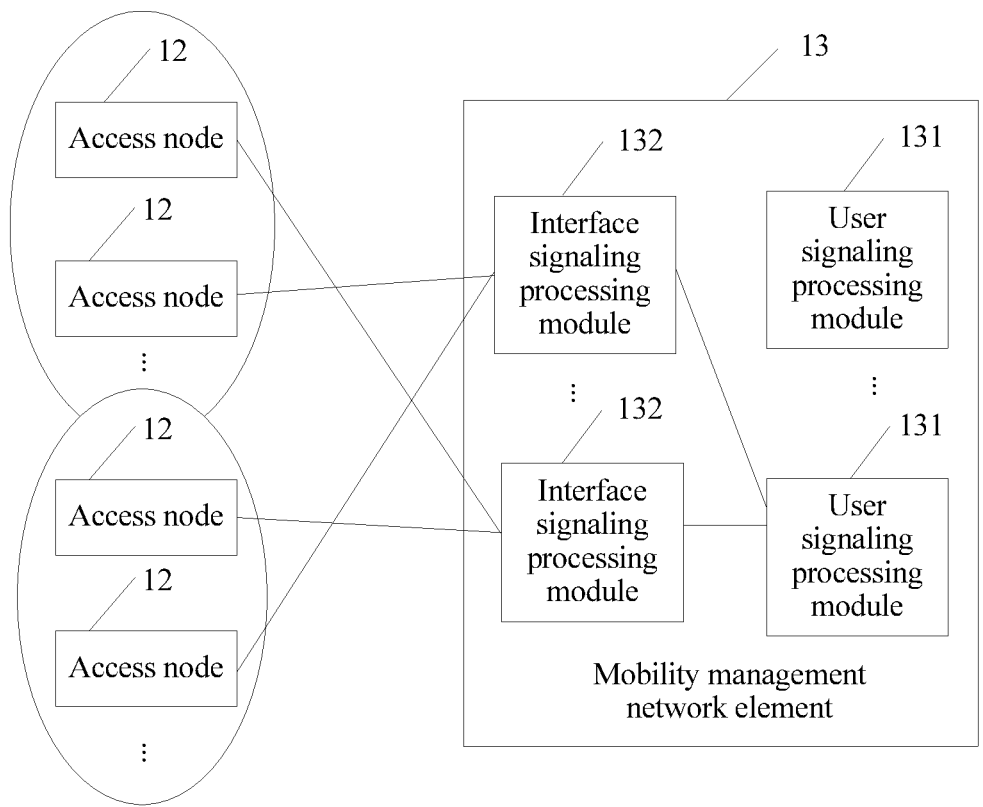
FIG. 3 is a schematic diagram of an architecture for processing a paging message based on the SCTP and a mobile communications network shown in FIG. 1.

Referring to FIG. 3, FIG. 3 is a schematic diagram of an architecture for processing a paging message based on the SCTP and a mobile communications network shown in FIG. 1. As shown in FIG. 3, a mobility management network element 13 includes multiple user signaling processing modules 131 and multiple interface signaling processing modules 132. In an actual application, there may be up to hundreds of the interface signaling processing modules 132. Multiple access nodes 12 separately establish an SCTP connection to the mobility management network element 13. Further, multiple SCTP connections of the multiple access nodes 12 are randomly and evenly distributed to all interface signaling processing modules 132 of the mobility management network element 13.

When the SCTP is being used to process the paging message, if a user terminal 11 is in an idle state, the mobility management network element 13 needs to broadcast the paging message to all access nodes 12 corresponding to a registration area in which the user terminal 11 located. Because there may be up to hundreds of access nodes 12 that serve the registration area in which the user terminal 11 is located, when initiating paging, one user signaling processing module 131 needs to send a paging message to the hundreds of interface signaling processing modules 132, and then the hundreds of interface signaling processing modules 132 separately send the paging message using the SCTP connections that are established to the access nodes 12. For example, it is assumed that there are 200 access nodes 12 in the registration area in which the user terminal 11 is located and the mobility management network element 13 has 100 interface signaling processing modules 132 in total. If one user signaling processing module 131 sends the paging message to all the interface signaling processing modules 132 and these interface signaling processing modules 132 further send the paging message to the access nodes 12 in the registration area, the mobility management network element 13 needs to process 300 paging messages in total in one paging process. In an actual application, the mobility management network element 13 initiates tens of thousands of times of paging per second, and therefore the mobility management network element 13 needs to process millions of paging messages.

Therefore, when the SCTP is used to process the paging message, although paging message transmission is highly reliable, when there are a large quantity of the access nodes 12, resource of the mobility management network element 13 is heavily consumed, which brings heavy processing load to the mobility management network element 13 and even causes a congestion problem when the consumption is extremely heavy.

Figure 4:
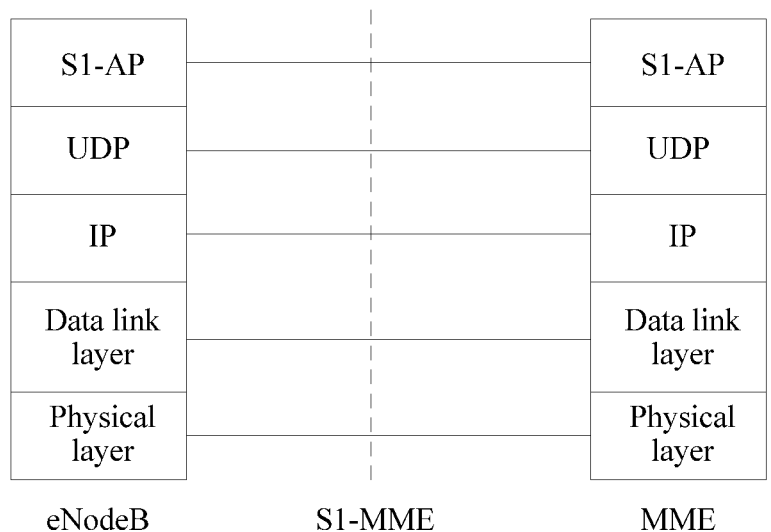
FIG. 4 is a schematic diagram of an architecture of an interface protocol stack between an eNodeB and an MME that are based on the UDP.

Referring to FIG. 4, FIG. 4 is a schematic diagram of an architecture of an interface protocol stack between an eNodeB and an MME that are based on the UDP. FIG. 4 differs from FIG. 2 in that the UDP is used on the basis of the IP to provide quick transmission for an application-layer message.

Figure 5:
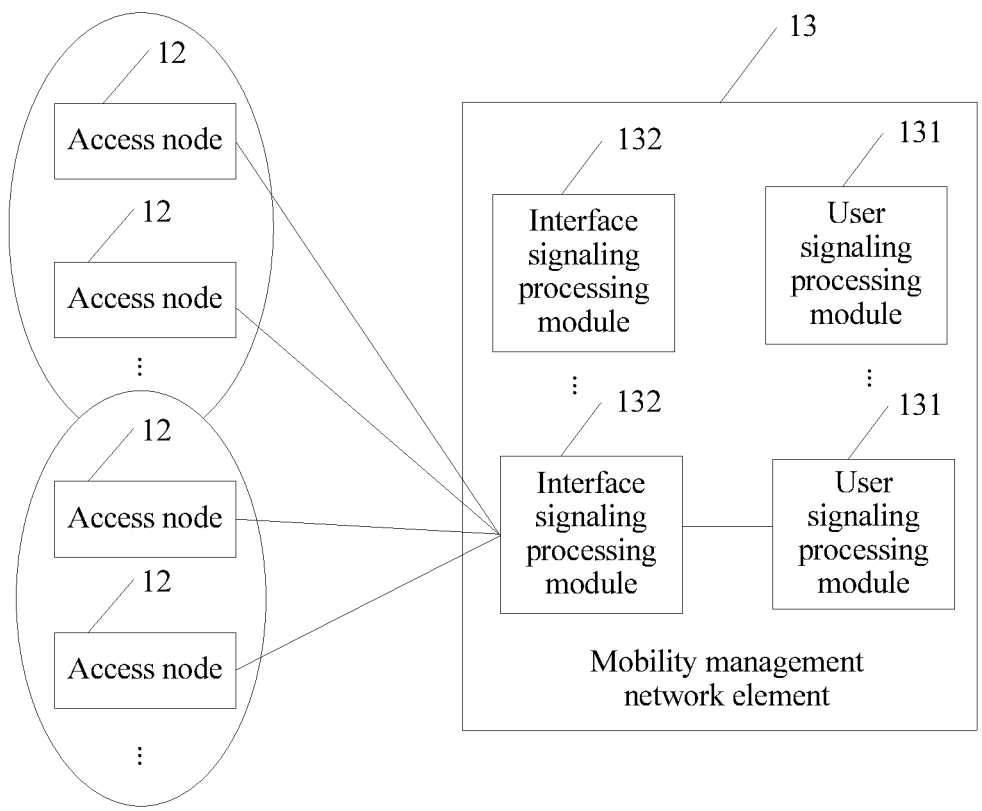
FIG. 5 is a schematic diagram of an architecture for processing a paging message based on the UDP and a mobile communications network shown in FIG. 1.

FIG. 5 is a schematic diagram of an architecture for processing a paging message based on the UDP and a mobile communications network shown in FIG. 1. As shown in FIG. 5, because a UDP features stateless switching and is connectionless, when interacting with an access node 12, a mobility management network element 13 may directly send a data packet using a port and according to a destination address, and the data packet may be sent using any one of interface signaling processing modules 132.

When the UDP is used to process a paging message, a user signaling processing module 131 may send the paging message to only one interface signaling processing module 132, and then the interface signaling processing module 132 sends the paging message to multiple access nodes 12 in a registration area in which a user terminal 11 is located. When the UDP is used to process the paging message, although transmission reliability of the paging message is relatively poor, when a quantity of access nodes 12 is extremely large, consumption of resources of the mobility management network element 13 is significantly reduced, and a congestion problem is avoided. In another embodiment, the user signaling processing module 131 may also directly send the paging message to multiple access nodes 12 in the registration area in which the user terminal 11 is located, which may further reduce the consumption of resources of the mobility management network element 13.

Figure 6:
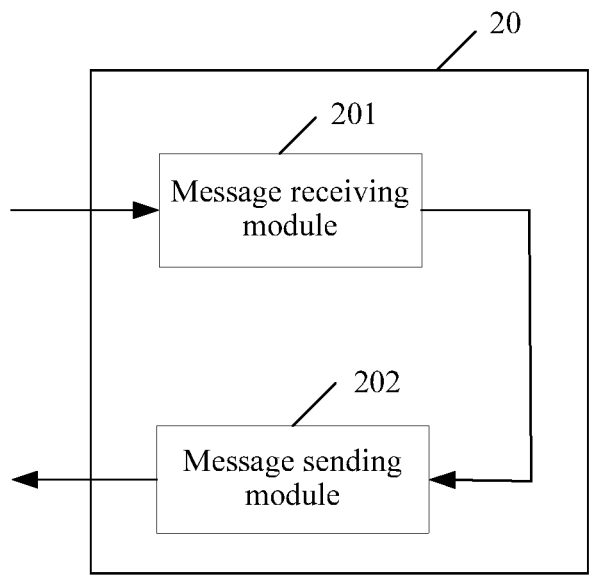
FIG. 6 is a schematic structural diagram of a first embodiment of a mobility management network element according to the present disclosure.

FIG. 6 is a schematic structural diagram of a first embodiment of a mobility management network element according to the present disclosure. As shown in FIG. 6, a mobility management network element 20 includes a message receiving module 201 and a message sending module 202.

The message receiving module 201 is configured to receive a node capability notification message sent by an access node, where the node capability notification message is used to indicate that the access node supports use of the UDP, which is different from the SCTP, to receive a paging message from the mobility management network element, and the access node supports use of the SCTP to receive the paging message from the mobility management network element.

The message sending module 202 is configured to select and use the UDP to send a first paging message to the access node after the message receiving module 201 receives the node capability notification message sent by the access node.

Further, once the message receiving module 201 receives the node capability notification message sent by the access node, it indicates that the message sending module 202 supports use of both the SCTP and the UDP to send the paging message to the access node. In this case, the message sending module 202 may select and use, according to a requirement of a user for reliable transmission of the paging message and a consumption condition of resources of the mobility management network element, the SCTP or the UDP to send the paging message to the access node. When a current paging message is a first paging message, if the consumption of resources of the mobility management network element is relatively heavy, the message sending module 202 selects and uses a communications protocol in which consumption of resources of a mobility management network element is relatively low, that is, the UDP, to send the first paging message to the access node. If the user has a high requirement for reliable transmission of the first paging message, the message sending module 202 selects a communications protocol with a high reliability, that is, the SCTP, to send the first paging message to the access node.

In this embodiment of the present disclosure, after the message receiving module 201 receives the node capability notification message sent by the access node, the message sending module 202 selects the UDP to send the first paging message to the access node such that a requirement of a user for reliable transmission of a paging message can be met, a consumption degree of resources of the mobility management network element can be reduced, and occurrence of congestion on the mobility management network element can be avoided.

Figure 7:
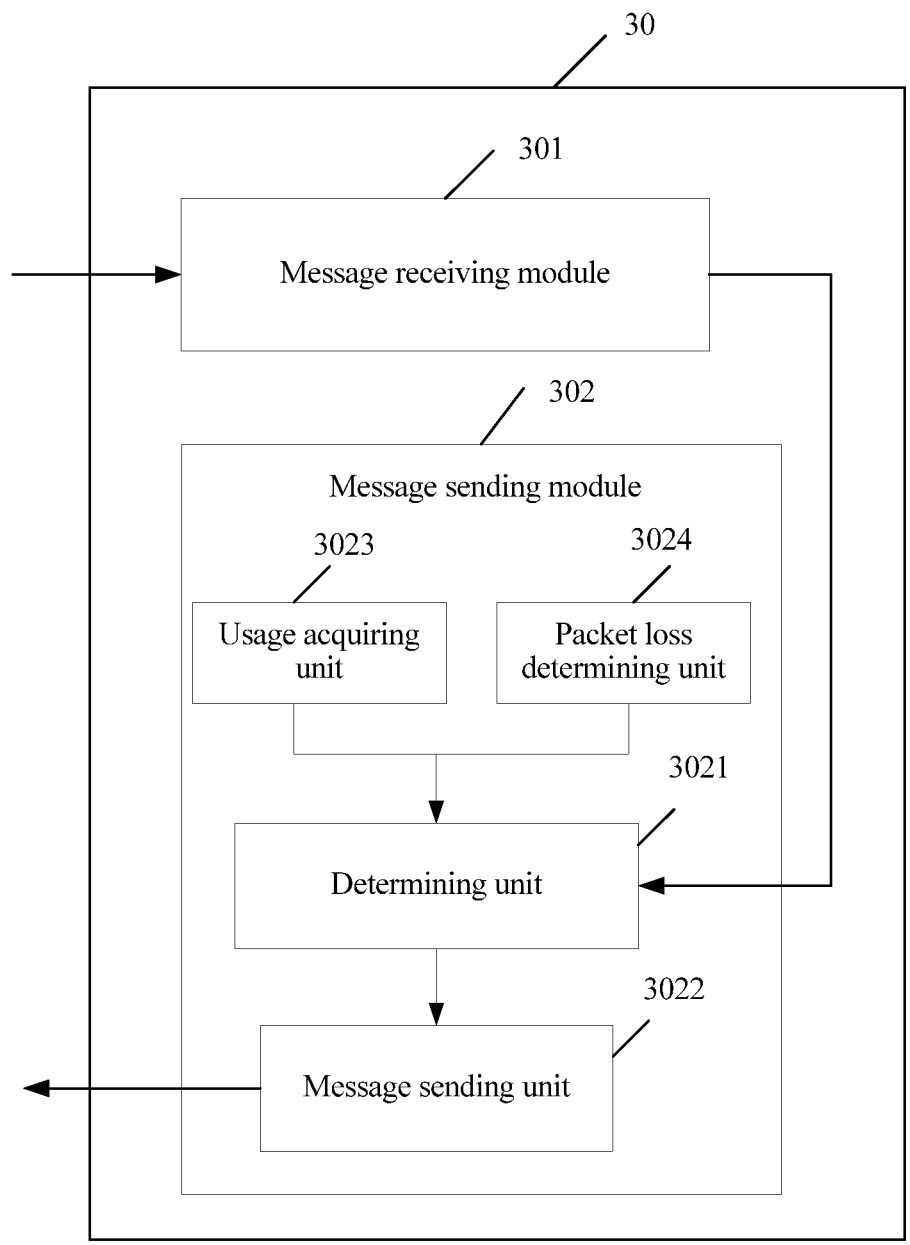
FIG. 7 is a schematic structural diagram of a second embodiment of a mobility management network element according to the present disclosure.

FIG. 7 is a schematic structural diagram of a second embodiment of a mobility management network element according to the present disclosure. As shown in FIG. 7, a mobility management network element 30 includes a message receiving module 301 and a message sending module 302.

The message receiving module 301 is configured to receive a node capability notification message sent by an access node, where the node capability notification message is used to indicate that the access node supports use of the UDP, which is different from the SCTP, to receive a paging message from the mobility management network element 30, and the access node supports use of the SCTP to receive the paging message from the mobility management network element 30.

In this embodiment, the node capability notification message may be an interface message that is newly added between the access node and the mobility management network element 30, or may be an existing interface message that is between the mobility management network element 30 and the access node and that carries a communication capability identifier that indicates whether the access node supports the UDP, for example, an S1 establishment request message or an eNodeB configuration update message, that is, an information element is added to or extended in the existing interface message to implement the communication capacity identifier in order to implement the node capability notification message.

The message sending module 302 is configured to select and use the UDP to send a first paging message to the access node after the message receiving module 301 receives the node capability notification message sent by the access node.

Furthermore, the message sending module 302 includes a determining unit 3021, a message sending unit 3022, a usage acquiring unit 3023, and a packet loss determining unit 3024.

The determining unit 3021 is configured to determine whether congestion occurs when the SCTP is being used by the mobility management network element to send the paging message. Further, the determining unit 3021 is connected to the usage acquiring unit 3023 and the packet loss determining unit 3024. The usage acquiring unit 3023 is configured to acquire usage of a central processing unit of the mobility management network element 30 when the SCTP is being used by the mobility management network element 30 to send the paging message. When the usage that is of the central processing unit and acquired by the usage acquiring unit 3023 exceeds a threshold, the determining unit 3021 determines that the congestion occurs when the SCTP is being used by the mobility management network element to send the paging message. The packet loss determining unit 3024 is configured to determine whether a phenomenon of a data packet loss occurs when the SCTP is being used by the mobility management network element 30 to send the paging message. When the packet loss determining unit 3024 determines that the phenomenon of the data packet loss occurs when the SCTP is being used by the mobility management network element 30 to send the paging message, the determining unit 3021 determines that the congestion occurs when the SCTP is being used by the mobility management network element 30 to send the paging message.

The message sending unit 3022 is configured to select and use the UDP to send the first paging message to the access node when the determining unit 3021 determines that the congestion occurs when the SCTP is being used by the mobility management network element to send the paging message. In addition, the message sending unit 3022 is further configured to select and use the SCTP to send the first paging message to the access node when the determining unit 3021 determines that congestion does not occur when the SCTP is being used by the mobility management network element to send the paging message.

In this embodiment of the present disclosure, after the message receiving module receives the node capability notification information sent by the access node, and when the determining unit determines that the congestion occurs when the SCTP is being used by the mobility management network element to send the paging message, the message sending unit selects and uses the UDP to send the first paging message to the access node in order to reduce a consumption degree of resources of the mobility management network element, and therefore alleviate a congestion degree of the mobility management network element.

Figure 8:
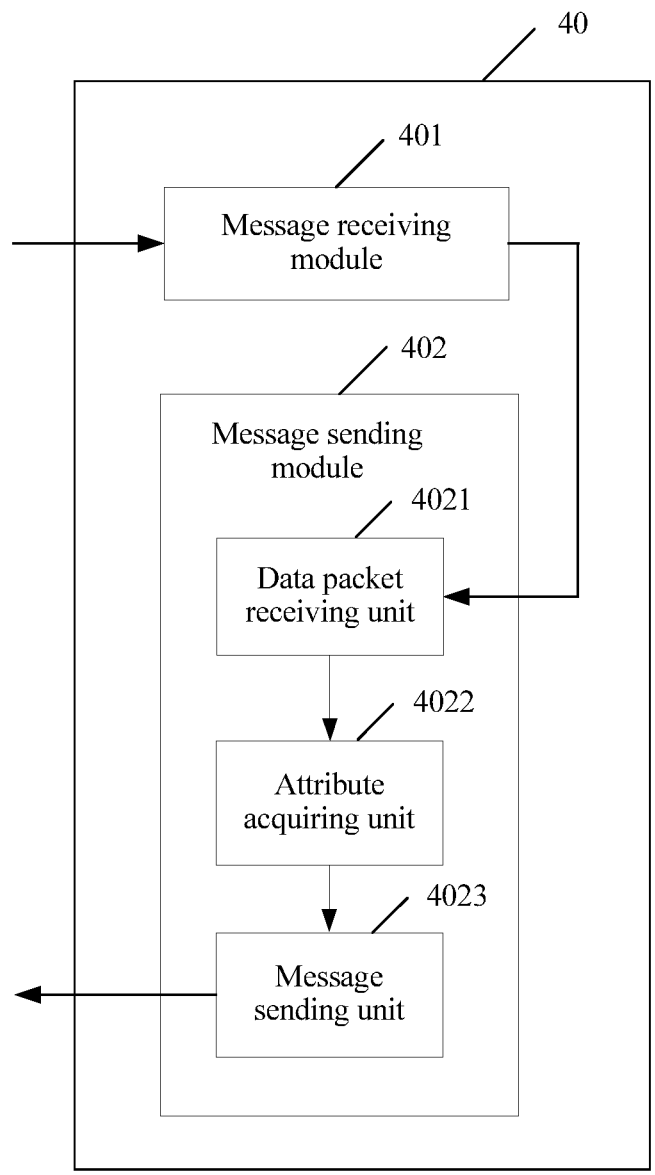
FIG. 8 is a schematic structural diagram of a third embodiment of a mobility management network element according to the present disclosure.

FIG. 8 is a schematic structural diagram of a third embodiment of a mobility management network element according to the present disclosure. As shown in FIG. 8, a mobility management network element 40 includes a message receiving module 401 and a message sending module 402.

The message receiving module 401 is configured to receive a node capability notification message sent by an access node, where the node capability notification message is used to indicate that the access node supports use of the UDP, which is different from the SCTP, to receive a paging message from the mobility management network element 40, and the access node supports use of the SCTP to receive the paging message from the mobility management network element 40.

In this embodiment, the node capability notification message may be an interface message that is newly added between the access node and the mobility management network element 40, or may be an existing interface message that is between the mobility management network element 40 and the access node and that carries a communication capability identifier that indicates whether the access node supports the UDP, for example, an S1 establishment request message or an eNodeB configuration update message, that is, an information element is added to or extended in the existing interface message to implement the communication capacity identifier in order to implement the node capability notification message.

The message sending module 402 is configured to select and use the UDP to send a first paging message to the access node after the message receiving module 401 receives the node capability notification message sent by the access node.

Further, the message sending module 402 includes a data packet receiving unit 4021, an attribute acquiring unit 4022, and a message sending unit 4023.

The data packet receiving unit 4021 is configured to receive a data packet that is sent by a serving gateway to trigger the paging message. The attribute acquiring unit 4022 is configured to acquire an attribute of the data packet according to the data packet received by the data packet receiving unit 4021. The message sending unit 4023 is configured to select and use, according to the attribute that is of the data packet and that is acquired by the attribute acquiring unit 4022, the UDP to send the first paging message to the access node.

The attribute of the data packet is determined according to one of the following parameters: an EBI, an LBI, an APN, a QCI, and an ARP.

Further, the attribute acquiring unit 4022 acquires an EPS bearer identifier that is corresponding to the data packet, locates a bearer context according to the EPS bearer identifier to obtain a corresponding APN or QCI, and determines the attribute of the data packet according to the APN or the QCI. Alternatively, the attribute acquiring unit 4022 acquires an LBI that is corresponding to the data packet, locates a bearer context according to the LBI to obtain a corresponding APN, and determines the attribute of the data packet according to the APN.

In this embodiment of the present disclosure, after the message receiving module 401 receives the node capability notification message sent by the access node, the message sending module 402 selects and uses, according to the attribute of the data packet, the UDP to send the first paging message to the access node such that a consumption degree of resources of the mobility management network element 40 is reduced, and occurrence of congestion is avoided.

Figure 9:
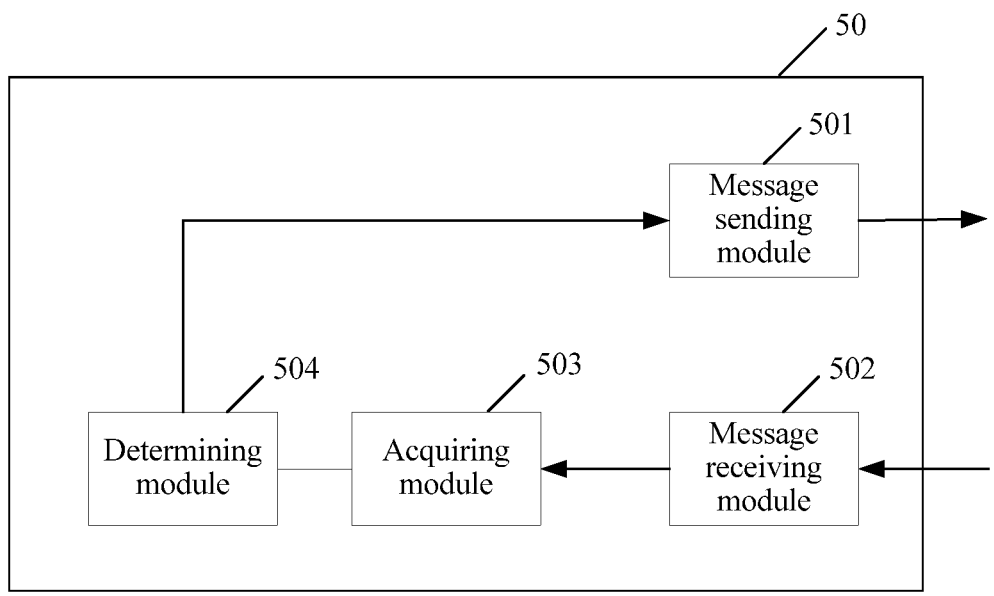
FIG. 9 is a schematic structural diagram of a first embodiment of an access node according to the present disclosure.

FIG. 9 is a schematic structural diagram of a first embodiment of an access node according to the present disclosure. As shown in FIG. 9, an access node 50 includes a message sending module 501, a message receiving module 502, an acquiring module 503, and a determining module 504.

The message sending module 501 is configured to send a node capability notification message to a mobility management network element, where the node capability notification message is used to indicate that the access node 50 supports use of the UDP, which is different from the SCTP, to receive a paging message from the mobility management network element, and the access node 50 supports use of the SCTP to receive the paging message from the mobility management network element.

In this embodiment, the node capability notification message may be an interface message that is newly added between the access node 50 and the mobility management network element, or may be an existing interface message that is between the mobility management network element and the access node 50 and that carries a communication capability identifier that indicates whether the access node supports the UDP, for example, an S1 establishment request message or an eNodeB configuration update message, that is, an information element is added to or extended in the existing interface message to implement the communication capacity identifier in order to implement the node capability notification message.

The message receiving module 502 is configured to receive, after the message sending module 501 sends the node capability notification message to the mobility management network element, a first paging message that is sent by the mobility management network element by selecting and using the UDP.

The acquiring module 503 is configured to acquire SCTP connection information of the mobility management network element according to a mobility management network element identifier in the first paging message after the message receiving module 502 receives the first paging message that is sent by the mobility management network element by selecting and using the UDP. The SCTP connection information may be any piece of SCTP connection information.

The determining module 504 is configured to determine whether a first IP address in the SCTP connection information acquired by the acquiring module 503 is the same as a second IP address in the first paging message. The first IP address is an IP address of a mobility management network element that is corresponding to the an SCTP connection when the access node 50 establishes the SCTP connection to the mobility management network element, and the second IP address is a source IP address in the first paging message.

The message sending module 501 sends the first paging message to a user terminal when the determining module 504 determines that the first IP address and the second IP address are the same, or the message sending module 501 discards the first paging message when the determining module 504 determines that the first IP address is different from the second IP address.

In this embodiment of the present disclosure, after the message sending module 501 sends the node capability notification information to the mobility management network element, the message receiving module 502 receives the first paging message that is sent by the mobility management network element by selecting and using the UDP such that consumption of resources of the mobility management network element is reduced, and occurrence of congestion is avoided.

Figure 10:
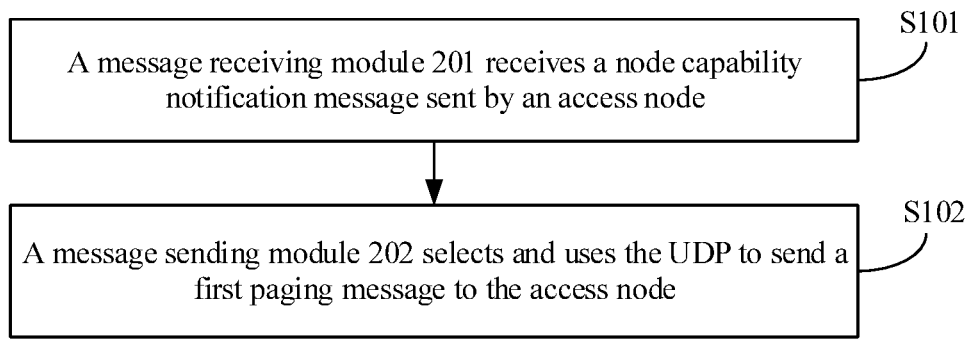
FIG. 10 is a schematic flowchart of a first embodiment of a paging message processing method according to the present disclosure.

FIG. 10 is a schematic flowchart of a first embodiment of a paging message processing method according to the present disclosure, and the method may be performed by an apparatus shown in FIG. 6. It should be noted that if results that are substantially the same exist, the method of the present disclosure is not limited to a sequence in the procedure shown in FIG. 10. As shown in FIG. 10, the method includes the following steps.

Step S101: A message receiving module 201 receives a node capability notification message sent by an access node.

In step S101, the node capability notification message is used to indicate that the access node supports use of the UDP, which is different from the SCTP, to receive a paging message from the mobility management network element, and the access node supports use of the SCTP to receive the paging message from the mobility management network element.

The node capability notification message may be directly configured on the access node, or may be sent to the access node using another network element, such as an operation and maintenance unit (OAM), in a mobile communications network.

The node capability notification message may be an interface message that is newly added between the access node and the mobility management network element, or may be an existing interface message that is between the mobility management network element and the access node and that carries a communication capability identifier that indicates whether the access node supports the UDP, for example, an S1 establishment request message or an eNodeB configuration update message, that is, an information element is added to or extended in the existing interface message to implement the communication capacity identifier in order to implement the node capability notification message.

Further, the communication capability identifier in the node capability notification message may only indicate that use of the UDP for communication is supported between the access node and the mobility management network element. No limitation is imposed on a case in which use of the UDP for communication is not supported between the access node and the mobility management network element. One case may be, when no communication capability identifier is carried in the node capability notification message, it indicates that use of the UDP for communication between the access node and the mobility management network element.

In addition, the communication capability identifier in the node capability notification message may only indicate that use of the UDP for communication is not supported between the access node and the mobility management network element. No limitation is imposed on a case in which use of the UDP for communication is supported between the access node and the mobility management network element. One case may be: when no communication capability identifier is carried in the node capability notification message, it indicates that use of the UDP for communication is supported between the access node and the mobility management network element.

Further, the communication capability identifier in the node capability notification message may indicate that use of the UDP for communication is supported or not between the access node and the mobility management network element.

Step S102: A message sending module 202 selects and uses the UDP to send a first paging message to the access node.

In step S102, after the message receiving module 201 receives, in step S101, the node capability notification message sent by the access node, the message sending module 202 selects and uses the UDP to send the first paging message to the access node.

In step S102, when the access node and the mobility management network element may use either the SCTP or the UDP to perform communication between them, the mobility management network element may select, according to a consumption degree of resources of the mobility management network element and a requirement of a user for reliable transmission of a paging message, whether to use the SCTP or the UDP to send the paging message to the access node.

The reliability for transmitting the paging message using the SCTP is high, but more resources of the mobility management network element need to be consumed, while the UDP can be used for quick transmission of the paging message without consuming a lot of resources of the mobility management network element, but reliability is low.

When consumption of resources of the mobility management network element is relatively heavy, the mobility management network element may select and use the UDP to transmit a current paging message, that is, the first paging message in order to reduce the consumption of resources of the mobility management network element. When the consumption of resources of the mobility management network element is relatively low, the mobility management network element may select and use the SCTP to transmit the first paging message in order to ensure reliable transmission of the paging message.

In another embodiment, when the paging message is being processed, because the mobility management network element needs to transmit the paging message to multiple access nodes that are connected to the mobility management network element, the mobility management network element may also select a part of the access nodes to transmit the paging message using the SCTP, and a remaining access node uses the UDP to transmit the paging message.

In this embodiment of the present disclosure, after the message receiving module receives the node capability notification message sent by the access node, the message sending module selects and uses the UDP to send the first paging message to the access node such that the paging message is transmitted with relatively high reliability, and at the same time, consumption of resources of the mobility management network element in a paging message processing process can be reduced, and a problem of congestion on the mobility management network element can be avoided.

Figure 11:
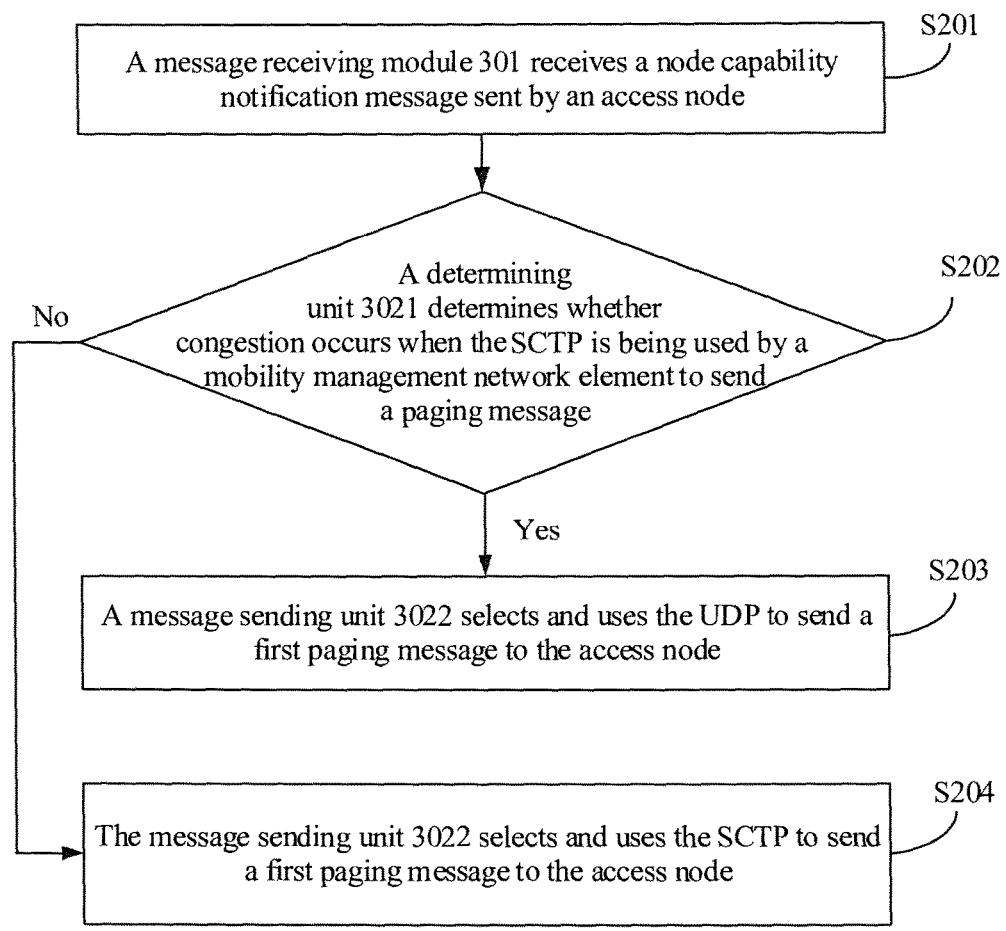
FIG. 11 is a schematic flowchart of a second embodiment of a paging message processing method according to the present disclosure.

FIG. 11 is a schematic flowchart of a second embodiment of a paging message processing method according to the present disclosure, and the method may be performed by an apparatus shown in FIG. 7. It should be noted that if results that are substantially the same exist, the method of the present disclosure is not limited to a sequence in the procedure shown in FIG. 11. As shown in FIG. 11, the method includes the following steps.

Step S201: A message receiving module 301 receives a node capability notification message sent by an access node.

In step S201, the node capability notification message is used to indicate that the access node supports use of the UDP, which is different from the SCTP, to receive a paging message from the mobility management network element, and the access node supports use of the SCTP to receive the paging message from the mobility management network element. The SCTP is the stream control transmission protocol, and the UDP is the user datagram protocol.

Step S202: A determining unit 3021 determines whether congestion occurs when the SCTP is being used by a mobility management network element to send a paging message, and if it is determined that the congestion occurs, step S203 is performed, and if it is determined that the congestion does not occur, step S204 is performed.

In step S202, a determining unit 3021 determines whether congestion occurs when the SCTP is being used by the mobility management network element to send the paging message, according to usage that is acquired by the usage acquiring unit 3023 and that is of a central processing unit of the mobility management network element when the SCTP is being used by the mobility management network element to send the paging message, or according to whether a phenomenon of a data packet loss occurs, which is determined by a packet loss determining unit 3024, when the SCTP is being used by the mobility management network element to send the paging message.

Further, the usage acquiring unit 3023 acquires the usage of the central processing unit of the mobility management network element when the SCTP is being used by the mobility management network element to send the paging message. When the usage that is of the central processing unit and acquired by the usage acquiring unit 3023 exceeds a threshold (for example, 80%), the determining unit 3021 determines that the congestion occurs when the SCTP is being used by the mobility management network element to send the paging message. The packet loss determining subunit 3024 determines whether a phenomenon of a data packet loss occurs when the SCTP is being used by the mobility management network element to send the paging message. When the packet loss determining subunit 3024 determines that the phenomenon of the data packet loss occurs when the SCTP is being used by the mobility management network element to send the paging message, the determining unit 3021 determines that the congestion occurs when the SCTP is being used by the mobility management network element to send the paging message.

Step S203: A message sending unit 3022 selects and uses the UDP to send a first paging message to the access node.

In step S203, when the determining unit 3021 determines, in step S202, that the congestion occurs when the SCTP is being used by the mobility management network element to send the paging message, the message sending unit 3022 selects and uses the UDP to send a current paging message, that is, the first paging message, to the access node in order to reduce a congestion degree.

Step S204: The message sending unit 3022 selects and uses the SCTP to send a first paging message to the access node.

In step S204, when the determining unit 3021 determines, in step S202, that the congestion does not occur when the SCTP is being used by the mobility management network element to send the paging message, the message sending unit 3022 selects and uses the SCTP to send the current paging message, that is, the first paging message, to the access node in order to ensure reliable transmission of the paging message.

In this embodiment of the present disclosure, when the message receiving module receives the node capability notification information sent by the access node, and when the determining unit determines that the congestion occurs when the SCTP is being used by the mobility management network element to send the paging message, the message sending unit selects and uses the UDP to send the first paging message to the access node, which can effectively reduce a congestion degree of the mobility management network element and therefore ensure that the mobility management network element works properly.

Figure 12:
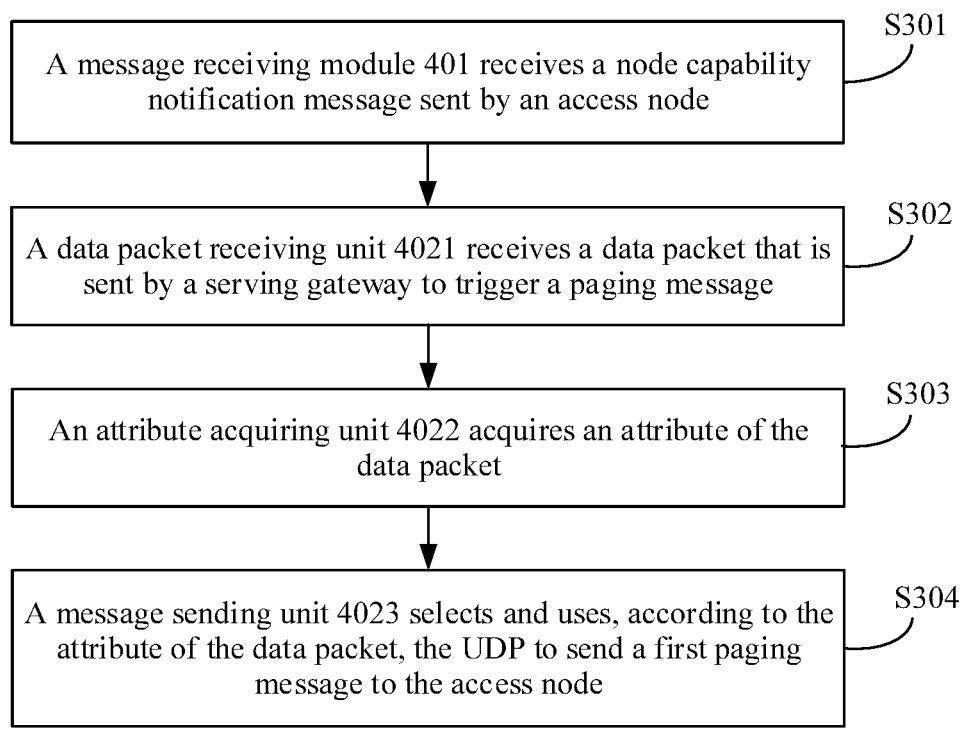
FIG. 12 is a schematic flowchart of a third embodiment of a paging message processing method according to the present disclosure.

FIG. 12 is a schematic flowchart of a third embodiment of a paging message processing method according to the present disclosure, and the method may be performed by an apparatus shown in FIG. 8. It should be noted that if results that are substantially the same exist, the method of the present disclosure is not limited to a sequence in the procedure shown in FIG. 12. As shown in FIG. 12, the method includes the following steps.

Step S301: A message receiving module 401 receives a node capability notification message sent by an access node.

In step S301, the node capability notification message is used to indicate that the access node supports use of the UDP, which is different from the SCTP, to receive a paging message from the mobility management network element, and the access node supports use of the SCTP to receive the paging message from the mobility management network element. The SCTP is the stream control transmission protocol, and the UDP is the user datagram protocol.

Step S302: A data packet receiving unit 4021 receives a data packet that is sent by a serving gateway to trigger a paging message.

Step S303: An attribute acquiring unit 4022 acquires an attribute of the data packet.

In step S303, the attribute of the data packet is determined according to one of the following parameters: an EBI, an LBI, an APN, a QCI, and an ARP.

Furthermore, when the attribute of the data packet is determined according to the EBI, the attribute acquiring unit 4022 first acquires an EBI corresponding to the data packet, and then locates a bearer context according to the EBI to obtain a corresponding APN or QCI, and finally determines the attribute of the data packet according to the APN or the QCI.

When the attribute of the data packet is determined by the LBI, the attribute acquiring unit 4022 first acquires an LBI corresponding to the data packet, and then locates a bearer context according to the LBI to obtain a corresponding APN, and finally determines the attribute of the data packet according to the APN.

The attribute of the data packet includes a connection attribute, a delay attribute and a priority attribute, and the like, that are of the data packet. The connection attribute of the data packet is corresponding to the APN. For example, an IMS APN indicates a data packet of an IMS corresponding to an access point, and an Internet APN indicates a data packet of an Internet system corresponding to an access point. The delay attribute of the data packet is corresponding to a QCI. For example, a QCI 3 indicates a data packet that has a high requirement on for a delay, and a QCI 9 indicates a data packet that has a low requirement for the delay. The priority attribute of the data packet is corresponding to an ARP. For example, a data packet whose priority in the ARP is 1 indicates a data packet with a high priority, and a data packet whose priority in the ARP is 3 indicates a data packet with a low priority.

Step S304: A message sending unit 4023 selects and uses, according to the attribute of the data packet, the UDP to send a first paging message to the access node.

In step S304, in view of the foregoing description, when the attribute of the data packet is the connection attribute, and when the acquired connection attribute of the data packet is the IMS APN, the message sending unit 4023 selects and uses the SCTP to send the first paging message to the access node, and when the acquired connection attribute of the data packet is the Internet APN, the message sending unit 4023 selects and uses the UDP to send a current paging message, that is, the first paging message, to the access node.

When the attribute of the data packet is the delay attribute, for a standard QCI attribute, a smaller value of a QCI indicates a higher requirement for a delay corresponding to the QCI. The delay attribute of the data packet may be acquired according to the value corresponding to the QCI. When the acquired data packet is a data packet whose delay attribute indicates a high requirement for a delay, for example, the value of the QCI is 3, the message sending unit 4023 selects and uses the SCTP to send the first paging message to the access node in order to ensure real-time transmission. When the acquired data packet is a data packet whose delay attribute indicates a low requirement for a delay, for example, the value of the QCI is 9, the message sending unit 4023 selects and uses the UDP to send the first paging message to the access node in order to reduce consumption of resources of the mobility management network element.

When the attribute of the data packet is the priority attribute, in a standard ARP attribute, a smaller value of the ARP indicates a higher priority corresponding to the ARP. The priority attribute of the data packet may be acquired according to the value corresponding to the ARP. When the acquired data packet is a data packet whose priority is high, for example, the value of the ARP is 1, the message sending unit 4023 selects and uses the SCTP to send the first paging message to the access node in order to ensure real-time transmission. When the acquired data packet is a data packet whose priority is low, for example, the value of the ARP is 3, the message sending unit 4023 selects and uses the UDP to send the first paging message to the access node in order to reduce the consumption of resources of the mobility management network element.

In this embodiment of the present disclosure, after the message receiving module receives the node capability notification message sent by the access node, the message sending unit selects and uses, according to the attribute of the data packet, the UDP to send the first paging message to the access node, which can effectively reduce consumption of resources of the mobility management network element and avoid occurrence of congestion on the mobility management network element.

Figure 13:
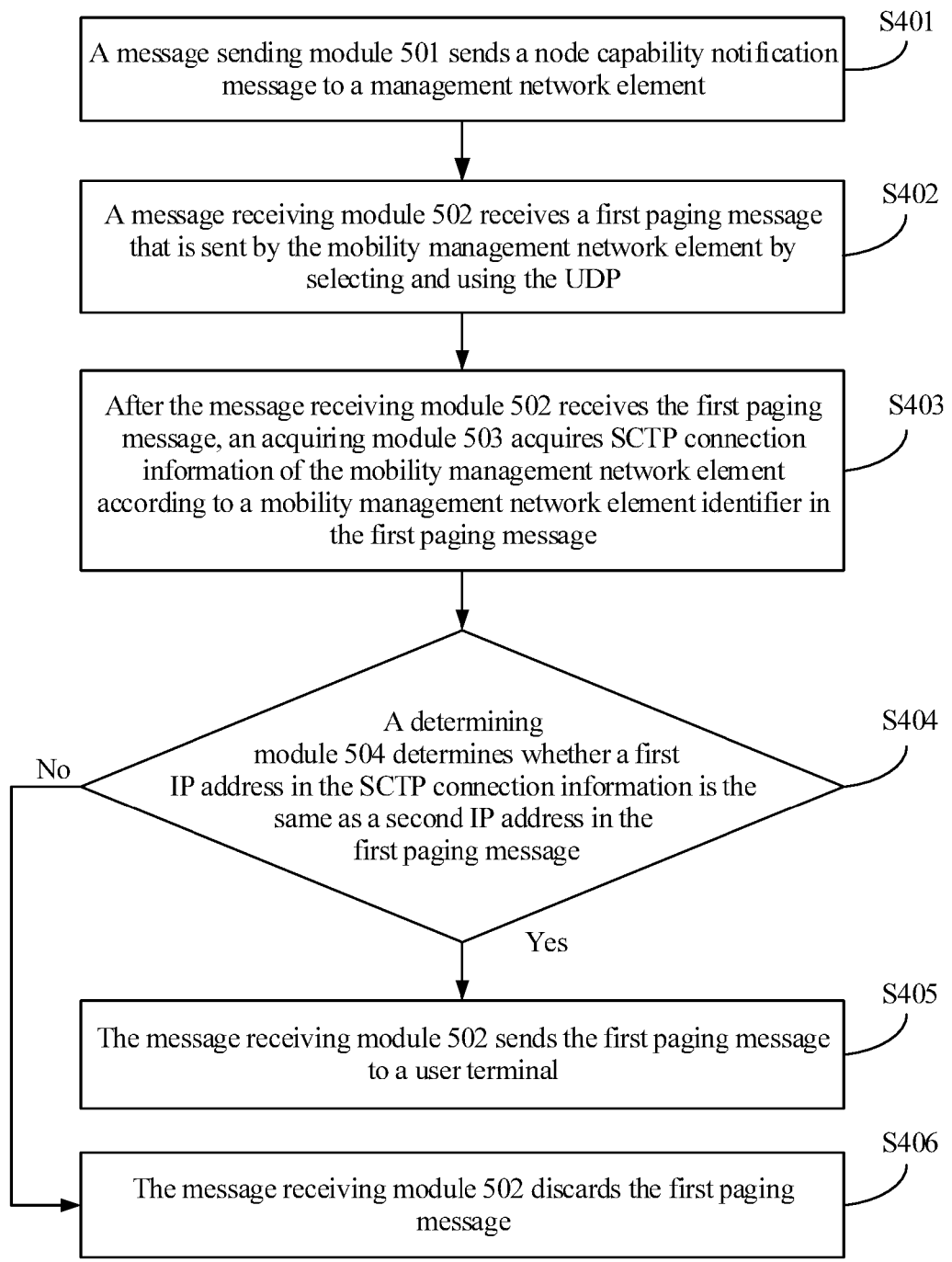
FIG. 13 is a schematic flowchart of a fourth embodiment of a paging message processing method according to the present disclosure.

FIG. 13 is a schematic flowchart of a fourth embodiment of a paging message processing method according to the present disclosure, and the method may be performed by an apparatus shown in FIG. 9. It should be noted that if results that are substantially the same exist, the method of the present disclosure is not limited to a sequence in the procedure shown in FIG. 13. As shown in FIG. 13, the method includes the following steps.

Step S401: A message sending module 501 sends a node capability notification message to a mobility management network element.

In step S401, the node capability notification message is used to indicate that the access node supports use of the UDP, which is different from the SCTP, to receive a paging message from the mobility management network element, and the access node supports use of the SCTP to receive the paging message from the mobility management network element.

Step S402: A message receiving module 502 receives a first paging message that is sent by the mobility management network element by selecting and using the UDP.

Step S403: After the message receiving module 502 receives the first paging message, an acquiring module 503 acquires SCTP connection information of the mobility management network element according to a mobility management network element identifier in the first paging message.

In step S403, the mobility management network element identifier is used to indicate a mobility management network element that establishes an SCTP connection to the access node. After the access node receives the paging message using the UDP, the access node acquires the SCTP connection information between the access mode and the mobility management network element according to the mobility management network element indicated by the mobility management network element identifier in the paging message.

Step S404: A determining module 504 determines whether a first IP address in the SCTP connection information is the same as a second IP address in the first paging message. If the first IP address and the second IP address are the same, step S405 is performed. If the first IP address is different from the second IP address, step S406 is performed.

In step S404, the first IP address in the SCTP connection information is an IP address of the corresponding mobility management network element when the access node establishes an SCTP connection to the mobility management network element, and the second IP address in the first paging message is a source IP address in the first paging message.

Step S405: The message receiving module 502 sends the first paging message to a user terminal.

In step S405, when the determining module 504 determines, in step S404, that an IP address of the mobility management network element is the same as the source IP address in the paging message, the message receiving module 502 pages the user terminal in a coverage area of the message receiving module 502.

Step S406: The message receiving module 502 discards the first paging message.

In step S406, when the determining module 504 determines, in step S404, that the IP address of the mobility management network element is different from the source IP address in the paging message, the message receiving module 502 discards the first paging message.

In this embodiment of the present disclosure, after the message sending module sends the node capability notification information to the mobility management network element, the message receiving module receives the first paging message that is sent by the mobility management network element by selecting and using the UDP, which can effectively reduce consumption of resources of the mobility management network element and avoid occurrence of congestion on the mobility management network element.

Figure 14:
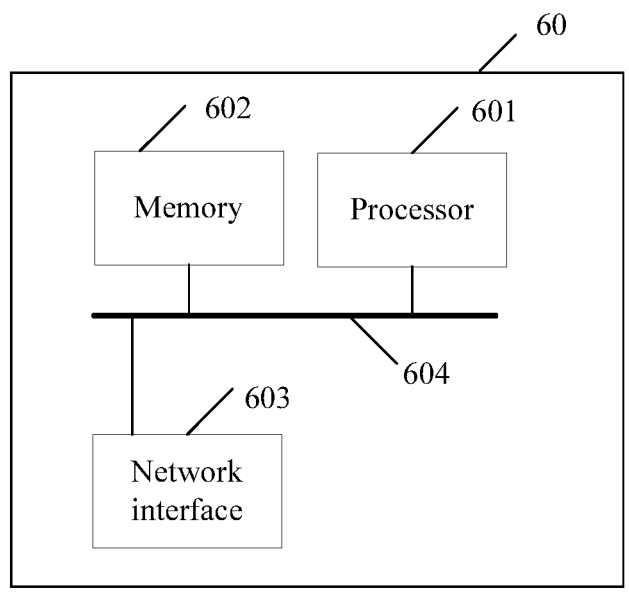
FIG. 14 is a schematic structural diagram of a fourth embodiment of a mobility management network element according to the present disclosure.

FIG. 14 is a schematic structural diagram of a fourth embodiment of a mobility management network element according to the present disclosure. As shown in FIG. 14, a mobility management network element 60 includes a processor 601, a memory 602, a network interface 603, and a bus 604, where the processor 601, the memory 602, the network interface 603 are separately coupled to the bus 604 to perform data interaction.

The processor 601 receives, using the network interface 603, a node capability notification message sent by an access node and stores the node capability notification message in the memory 602, where the node capability notification message is used to indicate that the access node supports use of the UDP, which is different from the SCTP, to receive a paging message from the mobility management network element 60, and the access node supports use of the SCTP to receive the paging message from the mobility management network element 60.

After the processor 601 receives the node capability notification message sent by the access node, the processor 601 selects and uses the UDP to send, using the network interface 603, the paging message stored in the memory 602 to the access node.

In this embodiment of the present disclosure, after the processor 601 receives the node capability notification message, the processor 601 selects and uses the UDP to send the first paging message to the access node such that a requirement of a user for reliable transmission of a paging message is met, consumption of resources of the mobility management network element 60 is reduced, and occurrence of congestion on the mobility management network element 60 is avoided.

Figure 15:
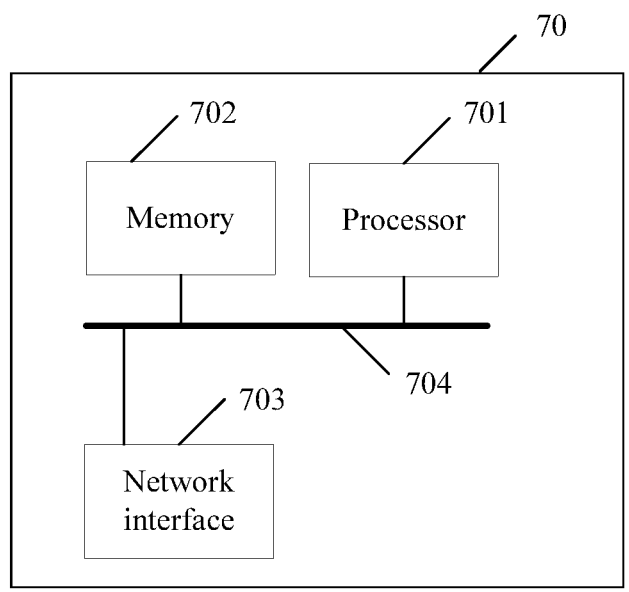
FIG. 15 is a schematic structural diagram of a second embodiment of an access node according to the present disclosure.

FIG. 15 is a schematic structural diagram of a second embodiment of an access node according to the present disclosure. As shown in FIG. 15, an access node 70 includes a processor 701, a memory 702, a network interface 703, and a bus 704, where the processor 701, the memory 702, the network interface 703 are separately coupled to the bus 704 to perform data interaction.

The processor 701 sends, using the network interface 703, a node capability notification message stored in the memory 702 to a mobility management network element, where the node capability notification message is used to indicate that the access node 70 supports use of the UDP, which is different from the SCTP, to receive a paging message from the mobility management network element, and the access node 70 supports use of the SCTP to receive the paging message from the mobility management network element.

The node capability notification message may be an interface message that is newly added between the access node 70 and the mobility management network element, or may be an existing interface message that is between the mobility management network element and the access node 70 and that carries a communication capability identifier that indicates whether the access node 70 supports the UDP, for example, an S1 establishment request message or an eNodeB configuration update message, that is, an information element is added to or extended in the existing interface message to implement the communication capacity identifier in order to implement the node capability notification message.

The processor 701 further receives, using the network interface 703, the first paging message that is sent by the mobility management network element by selecting and using the UDP and stores the first paging message in the memory 702.

In this embodiment of the present disclosure, after a processor 701 sends a node capability notification message, the processor 701 receives, using a network interface 703, a first paging message sent by a mobility management network element by selecting and using the UDP such that a requirement of a user for reliable transmission of a paging message is met, consumption of resources of the mobility management network element is reduced, and occurrence of congestion on the mobility management network element is avoided.

In the several embodiments provided in the present disclosure, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely embodiments of the present disclosure, and are not intended to limit the scope of the present disclosure. An equivalent structural or equivalent process alternation made using the content of the specification and drawings of the present disclosure, or an application of the content of the specification and drawings directly or indirectly to another related technical field, shall fall within the protection scope of the present disclosure.

What is claimed is:

1. A paging message processing method, comprising:
   receiving, by a mobility management network element, a node capability notification message from an access node, the node capability notification message indicating that the access node supports use of a user datagram protocol (UDP) to receive a paging message, and the access node also supporting use of a stream control transmission protocol (SCTP) to receive the paging message;
   selecting, by the mobility management network element, the UDP or the SCTP to send the paging message to the access node;
   sending, by the mobility management network element, the paging message to the access node using the UDP when the UDP is selected to send the paging message to the access node; and
   sending, by the mobility management network element, the paging message to the access node using the SCTP when the SCTP is selected to send the paging message to the access node.

2. The method of claim 1, wherein selecting the UDP or the SCTP to send the paging message to the access node comprises:
   determining whether a congestion occurred when the SCTP was used to send a prior paging message; and
   selecting the UDP to send the paging message to the access node when the congestion occurred.

3. The method of claim 2, wherein determining whether the congestion occurred when the SCTP was used to send the prior paging message comprises:
   acquiring a usage of a central processing unit of the mobility management network element when the SCTP was used to send the prior paging message;
   determining whether the usage exceeded a threshold; and
   determining that the congestion occurs when the SCTP was used to send the prior paging message and when the usage exceeded the threshold.

4. The method of claim 2, wherein determining that the congestion occurred when the SCTP was used to send the prior paging message comprises:
   determining that a data packet loss occurred when the SCTP was used to send the prior paging message; and
   determining that the congestion occurred when the SCTP was used to send the paging message and when the data packet loss occurred.

5. The method of claim 1, wherein selecting the UDP or the SCTP to send the paging message to the access node comprises:
   receiving a data packet from a serving gateway to trigger the paging message; and
   acquiring an attribute of the data packet, the paging message being sent to the access node using the UDP according to the attribute of the data packet.

6. The method of claim 5, wherein the attribute of the data packet is determined according to one of the following parameters:
- an enhanced packet switch (EPS) bearer identity;
- a linked bearer identity;
- an access point name;
- a quality of service (QoS) classification identifier; and
- an allocation/retention priority.

7. The method of claim 6, wherein acquiring the attribute of the data packet comprises:
- acquiring the EPS bearer identity corresponding to the data packet;
- locating a bearer context according to the EPS bearer identity to obtain a corresponding access point name or a QoS classifier identity; and
- determining the attribute of the data packet according to the access point name or the QoS classifier identity.

8. The method of claim 6, wherein acquiring the attribute of the data packet comprises:
- acquiring the linked bearer identity corresponding to the data packet;
- locating a bearer context according to the linked bearer identity to obtain a corresponding access point name; and
- determining the attribute of the data packet according to the access point name.

9. The method of claim 1, wherein the node capability notification message is an evolved node B (eNodeB) configuration update message or an S1 interface establishment request message that carries an identifier that indicates whether the access node supports the UDP.

10. A paging message processing method, comprising:
- sending, by an access node, a node capability notification message to a mobility management network element, the node capability notification message indicating that the access node supports use of a user datagram protocol (UDP), to receive a paging message from the mobility management network element, and the access node also supporting use of a stream control transmission protocol (SCTP) to receive the paging message from the mobility management network element; and
- receiving, by the access node, the paging message from the mobility management network element using the UDP.

11. The method of claim 10, further comprising:
- acquiring, by the access node, a SCTP connection information of the mobility management network element according to a mobility management network element identifier in the paging message after the access node receives the paging message from the mobility management network element using the UDP;
- determining whether a first Internet Protocol (IP) address in the SCTP connection information is same as a second IP address in the paging message;
- sending, by the access node, the paging message to a user terminal when the first IP address is same as the second IP address; and
- discarding, by the access node, the paging message when the first IP address is different than the second IP address.

12. The method of claim 10, wherein the node capability notification message is an evolved node B (eNodeB) configuration update message or an S1 interface establishment request message that carries an identifier that indicates whether the access node supports the UDP.

13. A mobility management network element, comprising:
- a memory comprising instructions; and
- a processor coupled to the memory and configured to execute the instructions, which causes the processor to be configured to:
  - receive a node capability notification message from an access node, the node capability notification message indicating that the access node supports use of a user datagram protocol (UDP) to receive a paging message, and the access node also supporting use of a stream control transmission protocol (SCTP) to receive the paging message;
  - select the UDP or the SCTP to send the paging message to the access node in response to the node capability notification message;
  - send the paging message to the access node using the UDP when the UDP is selected to send the paging message to the access node; and
  - send the paging message to the access node using the SCTP when the SCTP is selected to send the paging message to the access node.

14. The mobility management network element of claim 13, wherein the processor being configured to select the UDP or the SCTP to send the paging message to the access node comprises the processor being configured to:
- determine whether a congestion occurred when the SCTP was used to send a prior paging message; and
- select the UDP to send the paging message to the access node when the congestion occurred.

15. The mobility management network element of claim 14, wherein the processor being configured to determine that the congestion occurred when the SCTP was used to send the prior paging message comprises the processor being configured to:
- acquire a usage of a central processing unit of the mobility management network element when the SCTP was used to send the prior paging message;
- determine whether the usage exceeded a threshold; and
- determine that the congestion occurs when the SCTP was used to send the prior paging message and when the usage exceeded the threshold.

16. The mobility management network element of claim 14, wherein the processor being configured to determine that the congestion occurred when the SCTP was used to send the prior paging message comprises the processor being configured to:
- determine whether a data packet loss occurred when the SCTP was used to send the prior paging message; and
- determine that the congestion occurred when the SCTP was used to send the paging message and when the data packet loss occurred.

17. The mobility management network element of claim 13, wherein the processor being configured to select the UDP or the SCTP to send the paging message to the access node comprises the processor being configured to:
- receive a data packet from a serving gateway to trigger the paging message; and
- acquire an attribute of the data packet, the paging message being sent to the access node using the UDP according to the attribute of the data packet.

18. The mobility management network element of claim 17, wherein the attribute of the data packet is determined according to one of the following parameters:
- an enhanced packet switch (EPS) bearer identity;
- a linked bearer identity;
- an access point name;

a quality of service (QoS) classification identifier; and
an allocation/retention priority.

19. The mobility management network element of claim 18, wherein the processor is further configured to:
  acquire the EPS bearer identity corresponding to the data packet;
  locate a bearer context according to the EPS bearer identity to obtain a corresponding access point name or a QoS classifier identity; and
  determine the attribute of the data packet according to the access point name or the QoS classifier identity.

20. The mobility management network element of claim 18, wherein the processor is further configured to:
  acquire the linked bearer identity corresponding to the data packet;
  locate a bearer context according to the linked bearer identity to obtain a corresponding access point name; and
  determine the attribute of the data packet according to the access point name.

21. The mobility management network element of claim 13, wherein the node capability notification message is an evolved node B (eNodeB) configuration update message or an S1 interface establishment request message that carries an identifier that indicates whether the access node supports the UDP.

22. An access node, comprising:
  a memory comprising instructions; and
  a processor coupled to the memory and configured to execute the instructions, which causes the processor to be configured to:
    send a node capability notification message to a mobility management network element, the node capability notification message indicating that the access node supports use of a user datagram protocol (UDP) to receive a paging message from the mobility management network element, and the access node also supporting use of a stream control transmission protocol (SCTP) to receive the paging message from the mobility management network element; and
    receive the paging message from the mobility management network element using the UDP.

23. The access node of claim 22, wherein the processor is further configured to:
  acquire a SCTP connection information of the mobility management network element according to a mobility management network element identifier in the paging message after the access node receives the paging message from the mobility management network element using the UDP;
  determine whether a first Internet Protocol (IP) address in the SCTP connection information is same as a second IP address in the paging message;
  send the paging message to a user terminal when the first IP address is same as the second IP address; and
  discard the paging message when the first IP address is different than the second IP address.

24. The access node of claim 22, wherein the node capability notification message is an evolved node B (eNodeB) configuration update message or an S1 interface establishment request message that carries an identifier that indicates whether the access node supports the UDP.

* * * * *